Patented Nov. 1, 1938

2,135,469

UNITED STATES PATENT OFFICE 2,135,469

MONOAZO DYESTUFFS

Heinrich Morschel, Cologne-Deutz, and Otto Goll, Leverkusen I. G.-Werk, Germany, assignors to General Aniline Works, Inc., New York, N. Y., a corporation of Delaware No Drawing. Application July 28, 1936, Serial No. 93,116. In Germany August 16, 1935

2 Claims. (Cl. 260—198)

The present invention relates to new water insoluble monoazo dyestuffs, more particularly it relates to azo dyestuffs of the general formula:

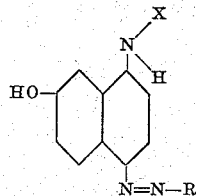

wherein X stands for a member selected from the group consisting of hydrogen, alkyl and aryl, and R stands for a radical of the diazotization component free from solubilizing groups.

Our new dyestuffs are obtainable by coupling in an acid medium 1.7-aminonaphthol or an N-alkyl or aryl substitution product thereof with diazo compounds which are free from groups causing solubility in water. The monoazo compounds thereby obtained are soluble in dilute alkalies, and, which is surprising, possess a good affinity for cotton fibers. Due to this property, which could not be foreseen, they are especially suitable for the manufacture of water-insoluble dyestuffs on the fiber (ice colors).

Example 1

Into an ice cold solution of 175 gs. of 1-amino-7-hydroxynaphthalene in dilute hydrochloric acid there is stirred the diazo solution produced in the known manner from 138 gs. of 2-nitraniline. At a reaction which is weakly acid to Congo red, formation of the dyestuff is soon complete. The reddish brown monoazo dyestuff 4-(2'-nitrobenzene) azo-1-amino- 7 - hydroxynaphthalene, which is insoluble in water, is isolated in the usual manner. Affinity for cotton: 20%.

The dyestuff corresponds to the following formula:

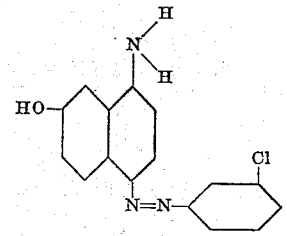

Example 2

In a similar manner the monoazo dyestuff from diazotized 2-chloraniline and 1-amino-7-hydroxynaphthalene is obtained in a weakly acid solution with a good yield. The dyestuff, which corresponds to the following formula:

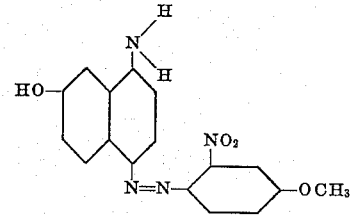

dissolves with a reddish brown coloration in an aqueous solution of caustic soda. Affinity for cotton: 25%.

Example 3

The monoazo dyestuff manufactured in an acid solution from diazotized 3-nitro-4-anisidine and 1-amino-7-hydroxynaphthalene dissolves with a cobalt blue coloration in concentrated sulfuric acid and with a violet-brown coloration in an aqueous solution of caustic soda. Affinity for cotton: 25%.

The dyestuff corresponds to the following formula:

Example 4

Diazotized 1-amino-7-hydroxynaphthlene is coupled according to Example 1 with 1-amino-7-hydroxynaphthalene. The monoazo dyestuff, which corresponds to the following formula:

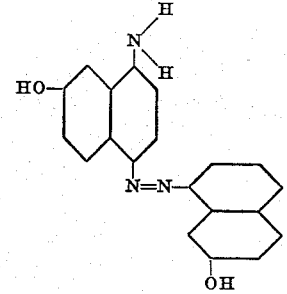

dissolves with a violet-brown coloration in an aqueous solution of caustic soda. Affinity for cotton: 25%.

Example 5

There is stirred into an ice-cold solution of 182 gs. of 1-methylamino-7-hydroxynaphthalene in dilute hydrochloric acid the diazo solution produced in the known manner from 138 gs. of 2-nitraniline. At a reaction which is weakly acid to Congo red formation of the dyestuff is soon complete. The brownish-red monoazo dyestuff 4-(2'-nitrobenzeneazo)-1-methylamino-7-hydroxynaphthalene which is insoluble in water is isolated in the usual manner.

The dyestuff corresponds to the following formula:

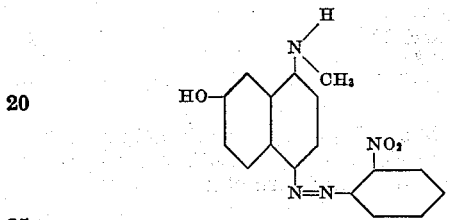

Example 6

To a solution of 280 gs. of 1-(4'-methoxyphenylamino)-7-hydroxynaphthalene in 1000 gs. of glacial acetic acid, at 10° C., there is added a diazo solution produced by diazotization of 138 gs. of 4-nitraniline in 500 ccs. of glacial acetic acid and 280 ccs. of hydrochloric acid of 30% strength with 69 gs. of sodium nitrite. After coupling is complete, the dyestuff 1-(4'-methoxyphenylamino)-4-(4''-nitrobenzeneazo)-7-hydroxynaphthalene is filtered off with suction, washed with acetic acid of 50% strength, and dried. The dyestuff obtained in this manner is a blackish-brown powder, which is soluble in pyridine with a blue coloration.

The dyestuff corresponds to the following formula:

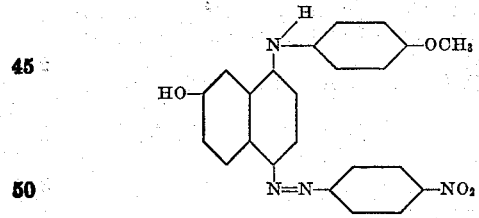

In an analogous manner the following dyestuffs have been produced:

4-(5'-chloro-2'-methoxybenzeneazo)-1-methylamino-7-hydroxynaphthalene, 4-(2'-chlorobenzeneazo)-1-ethylamino-7-hydroxynaphthalene, 4-(2'-methyl-4'-chlorobenzeneazo)-1-ethylamino-7-hydroxynaphthalene, 4-(2'-nitrobenzeneazo)-1-phenylamino-7-hydroxynaphthalene, 4-(2'-methoxy-benzene-azo)-1-amino-7-hydroxynaphthalene, 4-(2'-methyl-5'-chloro-benzene-azo)-1-amino-7-hydroxynaphthalene, 4-(2'-methoxy-5'-chloro-benzene-azo)-1-amino-7-hydroxynaphthalene, 4-(2'-nitro-4'-methyl-benzene-azo)-1-amino-7-hydroxynaphthalene, 4-(3'-chloro-benzene-azo)-1-ethylamino-7-hydroxynaphthalene, 4-(2'-nitro-benzene-azo)-1-ethylamino-7-hydroxynaphthalene.

We claim:

1. Water insoluble monoazo dyestuffs of the general formula:

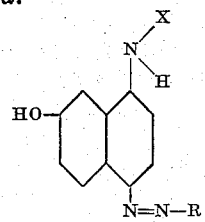

wherein X stands for a member selected from the group consisting of hydrogen, alkyl and aryl, and R stands for a member selected from the group consisting of radicals of the benzene and naphthalene series free from solubilizing groups, said dyestuffs having affinity for vegetable fibers.

2. The monoazo dyestuffs of the following formula:

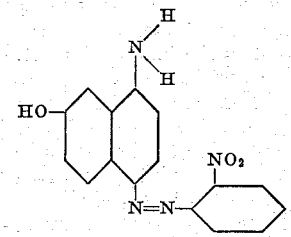

having affinity for the vegetable fiber.

HEINRICH MORSCHEL.
OTTO GOLL.